United States Patent
Wardle et al.

(10) Patent No.: US 6,176,998 B1
(45) Date of Patent: Jan. 23, 2001

(54) METHOD OF ELECTROCHEMICALLY MACHINING A BEARING RING

(75) Inventors: Frank Peter Wardle, Swindon (GB); Herve Girardin, Joue-les-Tours (FR)

(73) Assignee: SKF Engineering and Research Centre B.V., Utrecht (NL)

(*) Notice: Under 35 U.S.C. 154(b), the term of this patent shall be extended for 0 days.

(21) Appl. No.: 09/194,248
(22) PCT Filed: May 30, 1997
(86) PCT No.: PCT/NL97/00305
§ 371 Date: Jul. 6, 1999
§ 102(e) Date: Jul. 6, 1999
(87) PCT Pub. No.: WO97/45225
PCT Pub. Date: Dec. 4, 1997

(30) Foreign Application Priority Data

May 30, 1996 (NL) .................................. 1003233

(51) Int. Cl.⁷ ........................................... B23H 3/00
(52) U.S. Cl. ........................ 205/652; 205/654; 205/672; 205/686
(58) Field of Search .................. 205/652, 654, 205/672, 686, 665

(56) References Cited

U.S. PATENT DOCUMENTS

| 3,766,029 | * | 10/1973 | Haggerty | 205/652 |
| 3,900,374 | * | 8/1975 | Haggerty | 205/652 |
| 4,772,368 | * | 9/1988 | Rabian | 205/672 X |

FOREIGN PATENT DOCUMENTS

| 2032262 | 4/1971 | (DE) . |
| 9101379 | 3/1993 | (NL) . |

* cited by examiner

Primary Examiner—Donald R. Valentine
(74) Attorney, Agent, or Firm—Jeffrey D. Myers

(57) ABSTRACT

Method of manufacturing a bearing ring (1) for a bearing such as a ball bearing or cylindrical roller bearing, wherein the bearing ring (1) is rotated around an axis (6) and the amount of material removed is controlled by the choice of the cross section of an electrode (3) parallel to the surface of the raceway under the electrode (3). Thus the radius of the groove (2) is kept constant. An electrode with a suitably adapted convex cross section allows for the manufacture of bearing rings within a very narrow specification range. Thus the invention also relates to a bearing comprising an electrochemically machined bearing ring (1) according to the invention having excellent operational life and characteristics.

3 Claims, 1 Drawing Sheet

METHOD OF ELECTROCHEMICALLY MACHINING A BEARING RING

This application is a 371 of PCT/NL97/00305, filed May 30, 1997.

The present invention relates to a method of manufacturing a bearing ring for a bearing, whereby a groove to be serving as a raceway is formed which is subsequently electrochemically machined by passing a current across a narrow gap between said bearing ring and an electrode means, supplying electrolyte to the gap in a direction substantially tangential to the groove of the bearing ring, while rotating the bearing ring around an axis and removing material from the groove of said bearing ring facing said electrode.

Such a method is known from the Dutch patent application 91.01379. In this publication a method is described of electrochemical machining of a raceway of a bearing ring using a ball or slice thereof as the electrode.

This method has the disadvantage that during electrochemical machining not just the groove depth increases, but also the groove radius. Thus it is more difficult to match bearing rings and rotating bodies, resulting in a shorter operational life of the bearing.

The object of the present invention is to provide a simple and cost-effective method to electrochemically machine the raceway of a bearing ring, allowing more precise control over the shape and in particular maintaining the radius of curvature of the groove of the bearing ring, resulting in bearings having an increased operational life and better noise characteristics.

To this end the method according to the invention is characterized in that the groove is composed of a plurality of narrow circumferentially extending coaxial areas, and using as the electrode an electrode with a width tangential relative to the axis of rotation adapted to each particular circumferentially extending area such that during electrochemical machining the radius of curvature of the groove is kept constant.

Thus by using an electrode with a carefully chosen convex cross-section the rate of removal of material from each area rotating under the electrode is such that the radius of curvature of the groove remains constant.

According to a preferred embodiment the groove of the bearing ring is formed by honing and subsequently electrochemically machined using an electrode with a width tangential relative to the axis of rotation adapted to each particular circumferentially extending area such that the radius of curvature of the groove is kept constant.

This results in a bearing ring with superior characteristics with respect to waviness, smoothness and radius of curvature, allowing the manufacture of bearings of unprecedented quality.

Thus, the present invention also relates to a bearing comprising a bearing ring wherein the bearing ring is electrochemically machined according to the invention.

The invention will now be illustrated by means of the drawing in which.

Figure 1:
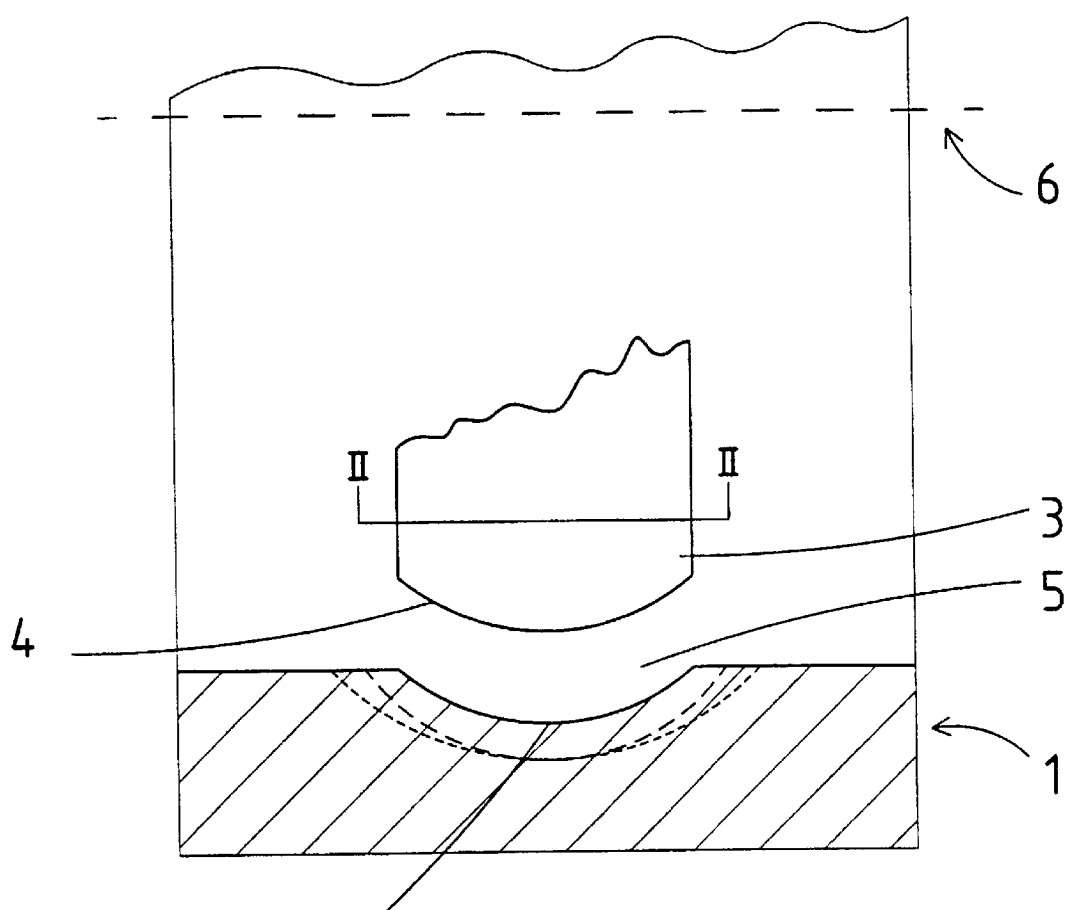
FIG. 1 is a schematic cross-section showing an electrode and a bearing ring to be machined.

FIG. 1 shows a bearing ring 1 comprising a groove 2 constituting the raceway of the bearing ring 1. An electrode 3 has a curved electrode surface 4 facing the groove 2, the curved electrode surface 4 and groove 2 being separated by a narrow gap 5 of, for example, 200 $\mu$m. The radius of curvature of the curved electrode surface 4 is the same as the radius of curvature of the groove 2. Electrolyte, such as a sodium nitrate solution, is supplied to the gap 5 in a direction substantially tangential to the surface of the groove 2. The bearing ring 1 is rotated around an axis 6 which axis 6 coincides with the central axis of the raceway. A current is passed across the narrow gap 5 to electrochemically machine the groove 2.

Figure 2:
FIG. 2 represents a cross-section along line II—II in FIG. 1.

If an electrode were used with the ordinary rectangular cross-section, not only the groove depth would increase but also the groove radius (dotted line). This would increase the tolerance range and hence make matching of bearing rings and rotating bodies more difficult. If this effect of increasing radius is not taken into account, the bearing will not have the correct internal clearance and contact angle and will have a shorter operational life. Thus with a convex electrode cross-section as shown in FIG. 2 it is possible to increase the groove depth but maintain a constant radius (broken line).

An abrasive polishing operation can remove waviness in a raceway. If an electrochemical machining method were used with a rectangular electrode, the resulting change in groove curvature radius would render the abrasive polishing operation ineffective, as the surface cannot be followed accurately. With the invention a constant groove curvature radius is maintained allowing an abrasive polishing operation to remove waviness of the raceway. This extends the operational life of a bearing even more.

A person skilled in the art can easily determine the exact shape of the electrode required. For example, if too much material is removed from the axial ends of the groove, the corresponding widths of the electrode 3 are too large and should be reduced. Instead of an electrode 3 with a convex cross-section, the cross-section may be biconvex as well.

The invention is not limited to bearing rings for ball bearings, but can be used for other bearings such as cylindrical roller bearings as well. Therefore the term "radius of curvature" is intended to mean the desired profile of the groove which is to be maintained.

What is claimed is:

1. A method of manufacturing a bearing ring for a bearing, wherein a groove to be serving as a raceway is formed which is subsequently electrochemically machined by passing a current across a narrow gap between said bearing ring and an electrode, supplying electrolyte to the gap in a direction substantially tangential to the groove of the bearing ring, while rotating the bearing ring around an axis and removing material from the groove of said bearing ring facing said electrode, wherein the groove comprises a plurality of narrow circumferentially extending coaxial areas, and wherein the method comprises the steps of providing as the electrode an electrode with a width tangential relative to an axis of rotation and a convex cross section adapted to each particular circumferentially extending area such that during electrochemical machining a radius of curvature of the groove is kept constant and electrochemically machining the groove using said electrode.

2. The method according to claim 1, additionally comprising the step of honing the groove of the bearing ring and subsequently electrochemically machining.

3. A bearing comprising a bearing ring, wherein the bearing ring is electrochemically machined according to claim 1.

* * * * *